United States Patent [19]

Arnett

[11] Patent Number: 4,652,204
[45] Date of Patent: Mar. 24, 1987

[54] APPARATUS FOR HANDLING HAZARDOUS MATERIALS

[76] Inventor: Edward M. Arnett, 2529 Perkins St., Durham, N.C. 27706

[21] Appl. No.: 761,918

[22] Filed: Aug. 2, 1985

[51] Int. Cl.⁴ .............................................. B65G 65/00
[52] U.S. Cl. ................................ 414/751; 414/744 A; 414/729; 901/1; 901/17; 901/31; 901/39; 901/47; 901/48; 294/119.2; 294/86.4
[58] Field of Search .................. 901/1, 17, 18, 15, 31, 901/39, 48, 47; 414/744 R, 744 A, 749, 751, 729; 294/119.2, 86.4, 19.2, 103.1

[56] References Cited

U.S. PATENT DOCUMENTS

| | | | |
|---|---|---|---|
| 3,119,009 | 1/1964 | Zeller | 901/17 X |
| 3,631,989 | 1/1970 | McCormick | 901/18 X |
| 3,760,956 | 9/1973 | Burch | 901/17 X |
| 3,888,360 | 6/1975 | Ando et al. | |
| 3,951,271 | 4/1976 | Mette | |
| 4,024,959 | 5/1977 | Gruner | |
| 4,283,165 | 8/1981 | Vertut | 901/1 X |
| 4,299,529 | 11/1981 | Inaba et al. | |
| 4,344,146 | 8/1982 | Davis, Jr. et al. | 901/47 X |
| 4,364,535 | 12/1982 | Itoh et al. | 901/48 X |
| 4,449,884 | 5/1984 | Motoda | |
| 4,502,830 | 3/1985 | Inaba et al. | 901/17 X |

FOREIGN PATENT DOCUMENTS 53-4964  1/1978  Japan ................................ 901/47 X Primary Examiner—Robert J. Spar
Assistant Examiner—Jay I. Alexander
Attorney, Agent, or Firm—Richard E. Jenkins

[57] ABSTRACT

A hazardous material handling apparatus capable of being remotely controlled so as to allow the operator to safely handle hazardous materials. The apparatus utilizes electric motors in order to provide for three-dimensional movement of the gripper. A television camera and remotely located television monitor may be utilized in order to facilitate remote control of the apparatus. A manually operated gripper is provided to allow for simple and inexpensive construction.

4 Claims, 4 Drawing Figures

APPARATUS FOR HANDLING HAZARDOUS MATERIALS

DESCRIPTION

1. Technical Field

This invention relates to an apparatus for handling hazardous materials. More specifically, the invention provides for a simple and inexpensive apparatus for handling objects suspected of being hazardous and for moving them or placing them in a safe environment. Hazardous materials contemplated to be handled by the apparatus include radioactive materials, materials containing dangerous components by accident, chemicals which may detonate due to improper storage or which have been deliberately placed in a public location as an act of arson or terrorism. It is further contemplated that the simple and inexpensive apparatus may be utilized in chemical stock rooms, hospitals, chemical manufacturing facilities, laboratories, explosive manufacturing facilities, bus and airline terminals and the like. The apparatus should be inexpensive to manufacture and simple to utilize in all of the aforementioned environments.

2. Background Art

The prior art contains a number of robotic handling devices which perform repetitive functions by means of complex mechanical movements and/or programming circuitry. These are typically expensive machines which are not capable of remotely controlled manipulation nor are they intended for a mass market. Typical of such apparatus is the mechanical handling device disclosed in U.S. Pat. No. 4,024,959. This patent discloses an automated gripper capable of vertical, horizontal and pivotal movement. A complex drive system provides for control of gripper motions as a function of force and not as a function of distance so as to provide enhanced versatility of application. Other representative programmable robot handling apparatus are disclosed in U.S. Pat. No. 3,951,271 and U.S. Pat. No. 3,888,360.

Another type of robot is taught by U.S. Pat. No. 4,449,884. This patent discloses an improved industrial robot comprising a first arm pivotally mounted on an upright post and a second arm pivotally mounted to said first arm in such a fashion that a load may be transported in a two-dimensional direction by a single linear movement of the second arm. This apparatus does not provide for the three-dimensional movement of the present invention and it apparently does not provide for remotely controlled manipulation.

In summary, it is believed that prior art robotic apparatus are not satisfactory to perform the intended function of the subject apparatus. Whereas previously known robots and automated handling devices have tended to be complex and internally programmed for repetitive manipulations, the present apparatus is of simplified construction so as to be made available in the mass market for handling hazardous materials. Moreover, the instant apparatus for handling hazardous materials utilizes remote controls to manipulate movement of the gripper by the operator of the apparatus.

DISCLOSURE OF THE INVENTION

The present invention is directed to an improved apparatus for handling hazardous materials which is of simple and inexpensive construction and utilizes remote control by the operator in order to manipulate the gripper thereof. It is also contemplated that a closed circuit television camera and monitor may be utilized in conjunction with the apparatus in order to facilitate safe and expedient handling and/or disposal of hazardous materials. The simple and inexpensive apparatus is intended for use in laboratories, hospitals, chemical stock rooms and manufacturing facilities, airplane and bus terminals and similar locations.

Usage of the apparatus would be initiated by the discovery of a hazardous material. The apparatus would be moved into proximity with the hazardous material so that the material would be within reach of its gripper. Thereafter, the operator would withdraw to a safe distance and utilize the remote controls associated with the apparatus in order to manipulate the gripper so as to initially grasp the hazardous material. Next, the hazardous material would typically be transported a limited distance by the gripper and placed in a desired location or perhaps into a container so as to obviate the danger posed by the previously exposed hazardous material. The container for the hazardous material could then be removed to an appropriate location and the apparatus removed to its stored or inoperative location.

The apparatus of the present invention comprises a movable base having rollers or wheels thereunder and with an upstanding support pivotally secured thereto. A horizontally extending support arm is mounted on the upstanding support so as to be capable of being vertically adjusted by an associated electric motor and drive. A gripper is mounted on the support arm so that it may be horizontally adjusted by an associated electric motor and drive. A third electric motor and drive are provided in order to provide motivation for pivotally adjusting the upstanding support having the support arm and gripper mounted thereon. In this fashion the apparatus of the present invention is provided with the capability for the gripper to be moved vertically, horizontally and in a lateral pivotal fashion in order to provide substantial flexibility in handling hazardous materials.

The apparatus is also provided with an electrically connected remote control for manipulating the three electric motors associated with the vertical, horizontal and lateral pivotal movement of the gripper. A remote control is also utilized in order to mechanically operate the grasping and releasing function of the gripper. It is further contemplated that the invention may utilize a closed circuit television camera in proximity to the hazardous material and a monitor in electrical connection therewith and in proximity to the remote controls in order to facilitate operation of the apparatus. In this fashion, the operator may utilize the simple and inexpensive device of the instant invention from a safe distance in order to handle a dangerous or hazardous material as necessary in order to either remove it from the environment or otherwise manipulate it from a safe distance.

Therefore, it is a primary object of the present invention to provide a simple and inexpensive apparatus for handling hazardous materials.

Another object of the invention is to provide a simplified and inexpensive apparatus for use in a wide variety of applications with the operator positioned at a safe distance from the apparatus through the use of remote controls.

A still further objective of the invention is to provide a simple and inexpensive apparatus for handling hazardous materials which may be made widely available for use in applications not heretofore feasible in order to reduce human risk when handling hazardous materials.

BEST MODE FOR CARRYING OUT THE INVENTION

Figure 1:
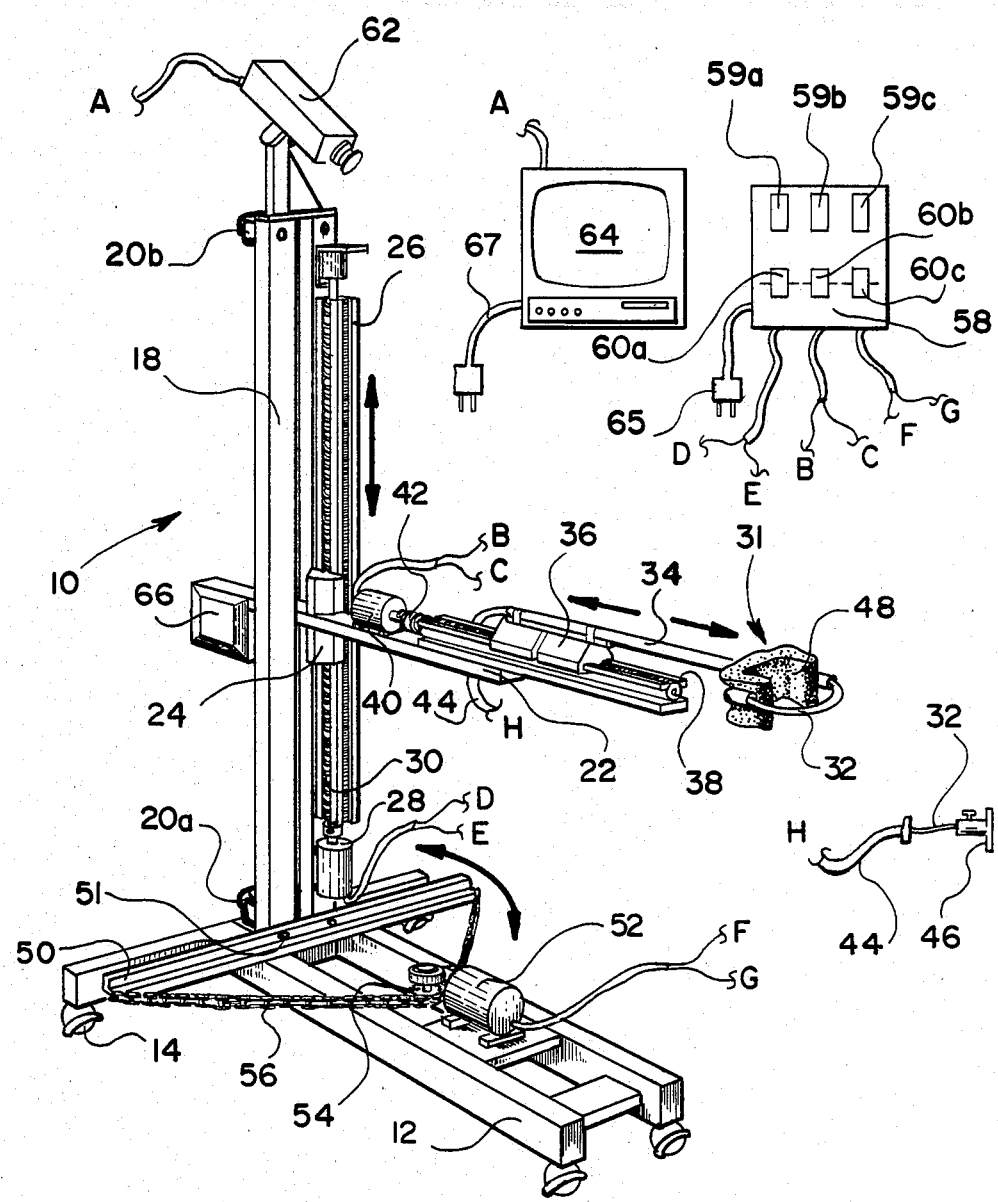
FIG. 1 is a perspective view of the apparatus of the present invention.
Figure 2:
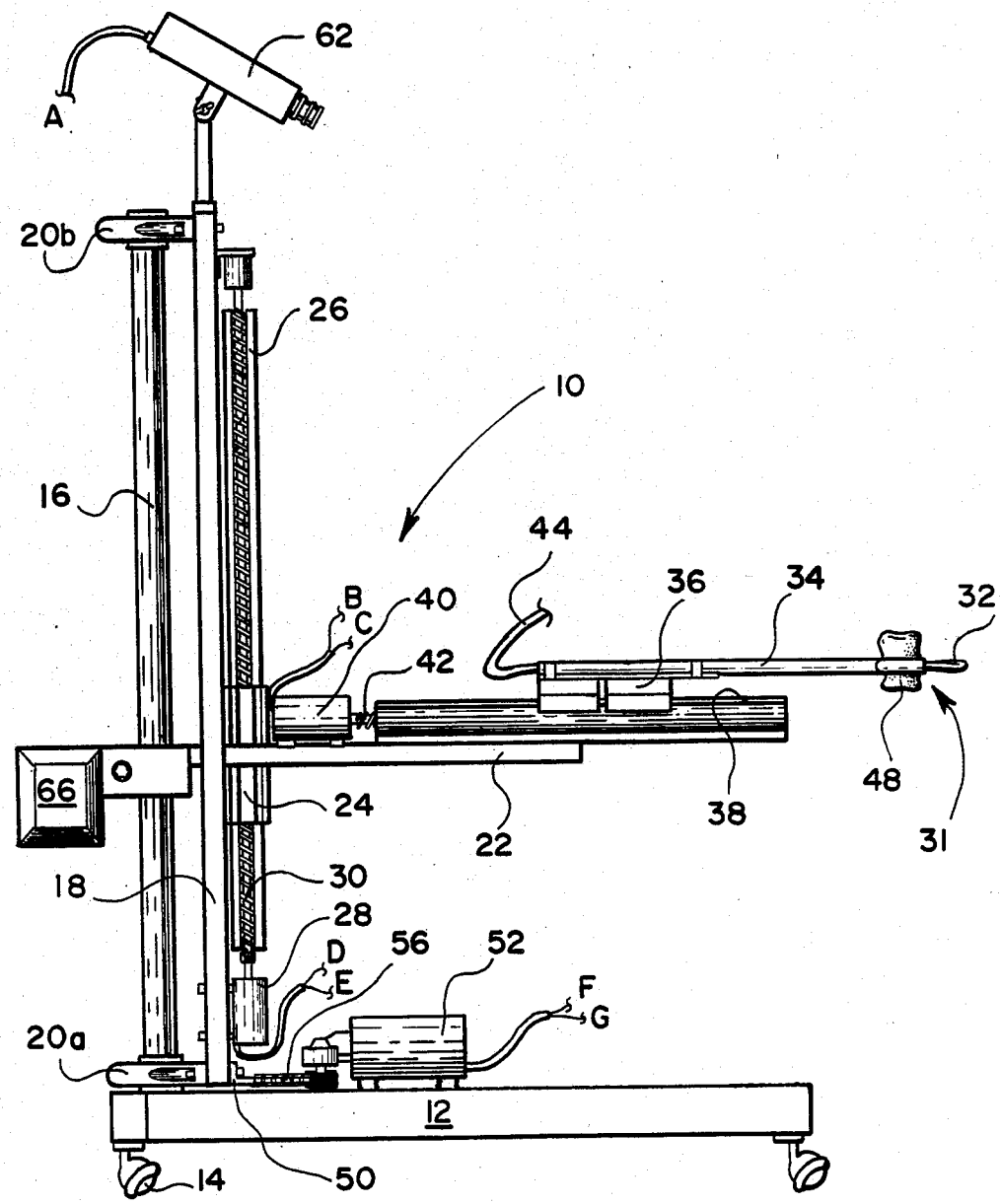
FIG. 2 is a side elevation view of the apparatus of the present invention.
Figures 3, 4:
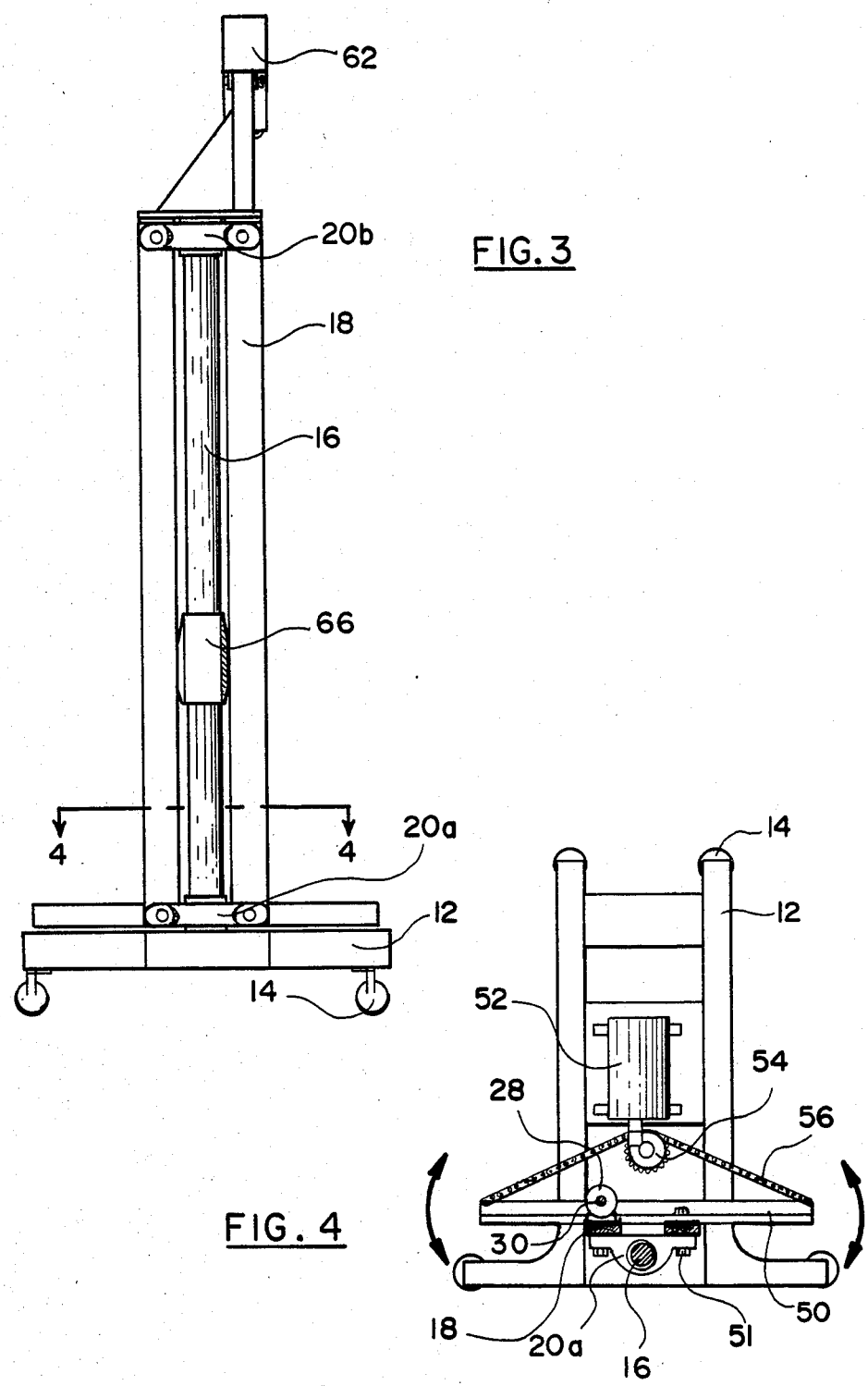
FIG. 3 is a back view of the apparatus of the present invention.
FIG. 4 is a cross sectional view taken along the section line 4—4 of FIG. 3.

Referring to FIGS. 1–3, a perspective view of the apparatus of the present invention is illustrated and designated generally by the numeral 10. Apparatus 10 comprises a base 12 having rollers 14 secured to the bottom thereof in order that apparatus 10 may be easily moved into a position in proximity to a hazardous material to be handled. A shaft 16 is fixedly mounted on base 12 and extends upwardly therefrom in a substantially vertical position. An upstanding support structure 18 is pivotally secured to shaft 16 through the use of FAFNIR bearings 20a, 20b which allow support structure 18 to pivot about shaft 16 relative to base 12. A support arm 22 is adjustably mounted on support structure 18 by being secured to associated trolley 24 which rides along guide rail 26 mounted to support structure 18. An electric motor 28 is mounted to support structure 18 to drive worm 30 which extends through guide rail 26 so as to drive trolley 24 mounted thereto. Although the perferred embodiment of the apparatus of the present invention utilizes the abovedescribed motor and drive to vertically adjust support arm 22, it is contemplated that other conventional drive means may be substituted therefor.

A gripper, generally designated 31, is adjustably mounted on support arm 22 so as to be horizontally adjustable in order to facilitate proper handling of hazardous materials. Gripper 31 includes closed-loop cable 32 and metal conduit 34 which is fixedly secured to trolley 36. Trolley 36 is adapted to travel along horizontally extending guide rail 38 which is fixedly mounted to support arm 22. Electric motor 40 drives worm 42 which extends through guide rail 38 so as to drive trolley 36 and gripper 31 secured thereto.

Looking more specifically now at gripper 31, it should be appreciated that it comprises closed-loop cable 32 extending from the diverging open ends of metal conduit 34. Coaxial cable 44 is secured to the other end of metal conduit 34 and includes handle 46 on the remote end thereof which is fastened to cable 32 so that the cable may be opened or closed as desired about a hazardous material in order to facilitate movement of the material from one position to another. Cable 32 may be locked into a fastened position around a hazardous material by securing a vise grip wrench or other suitable device to cable 32 between handle 46 and coaxial cable 44. This adjustment is intended to be accomplished at a remote distance from apparatus 10 in order to assure the safety of the user. Gripper 31 also includes resilient padding 48, preferably foam rubber, secured to the Y-shaped end of metal conduit 34 in order to minimize shocks or other disturbances to a hazardous material being handled by gripper 31. Other manual gripper mechanisms could be utilized as desired.

As best seen in FIGS. 1 and 4, a tiller arm 50 is secured by bolts 51 to support structure 18 and extends transversely to the longitudinal axis of base 12 when apparatus 10 is in its inoperative mode. Electric motor 52, a BODINE gearhead motor, is secured to base 12 and operatively engages tiller arm 50 by means of sprocket 54 and chain 56. Activation of motor 52 results in pivotal movement of support structure 18 about shaft 16 so as to provide a desired lateral pivotal movement to gripper 31 as needed. It should be understood that although the preferred embodiment of the present invention contemplates the utilization of A/C (alternating current) reversible electric motors 28, 40, 52, it is possible to utilize D.C. (direct current) electric motors as an alternative and to provide an electrically connected battery source carried by apparatus 10 to energize the electric motors.

In addition to the remote control of gripper 31 provided for by coaxial cable 44 and associated handle 46, the apparatus provides for a remote control 58 which is electrically connected to each of electric motors 28, 40, 52. As best seen in FIG. 1, remote control 58 includes motor speed adjustment switches 59a–59c which provide for independent speed control of electric motors 28, 40, 52, respectively. Remote control 58 also includes directional switches 60a–60c which provide for independent control of the rotational direction of electric motors 28, 40, 52, respectively. It should be appreciated that remote control 58 allows for vertical, horizontal and lateral pivotal adjustment of gripper 31 by the operator in order to best handle a hazardous material with the apparatus of the present invention. Remote control 58 in conjunction with handle 46 (for remotely adjusting closed-loop cable 32) allow an operator of apparatus 10 to control it at a safe distance from the hazardous material being handled. Furthermore, it is contemplated that a closed circuit television system may be utilized by apparatus 10. The television system comprises a miniature television camera 62, such as an RCA Series 2000 CCTV camera, which may either be utilized in free standing fashion or secured to apparatus 10 and focused on gripper 31 and the hazardous material to be handled. A television monitor 64 is electrically connected to camera 62 and preferably positioned in a remote location in close proximity to remote control 58 and remote handle 46 in order to facilitate operation of apparatus 10. Remote control 58 is energized through power line 65 and television monitor 64 is energized through power line 67 which are both plugged into a convenient electrical socket prior to operation of apparatus 10. Two or more television cameras and monitors could be utilized as desired to provide for stereoscopic-type vision. As best observed in FIGS. 2 and 3, a counterweight 66 is provided on the end of support arm 22 remote from gripper 31 so as to prevent binding of support arm 22 on vertical shaft 16 and to otherwise facilitate operation of the apparatus. Furthermore, it is contemplated that the inventive apparatus could be provided with a conventional remote control drive mechanism if desired to facilitate placement thereof into an extremely dangerous environment (e.g., radioactive environment or environment where explosion is imminent).

In operation, apparatus 10 is moved manually into close proximity to a hazardous material which must be manipulated in some fashion for safe removal. The operator assures that camera 62 is focused on gripper 31 and the hazardous material and then removes himself to a remote and safe location prior to attempting to operate apparatus 10. Power lines 65 and 67 are plugged into an electrical outlet to energize apparatus 10. At the remote location, the operator is able to utilize remote control 58 in order to impart vertical, horizontal and lateral pivotal movement in order to place gripper 31 around the hazardous material. Next, the operator utilizes remote handle 46 associated with coaxial cable 44 in order to tighten cable 32 about the hazardous material and secure it snugly against resilient padding 48 and the Y-shaped end of conduit 34. Cable 32 may be locked into position by securing a vise grip wrench to cable 32 between handle 46 and coaxial cable 44 or by other suitable conventional means. The operator utilizes television monitor 64 as necessary in order to facilitate and expedite the handling operation. When the hazardous material has been deposited in a suitable container or otherwise handled as desired, the operator disconnects power lines 65 and 67 and returns to apparatus 10 to remove it from the operational site in proximity to the hazardous material. It may typically be returned to a storage area in the facility in which it was utilized in order to be used again as needed.

While the instant invention has been shown and described herein in what is conceived to the most practical and preferred embodiment, it is recognized that departures may be made therefrom within the scope of the invention, which is therefore not to be limited to the details disclosed herein but is to be accorded the full scope of the claims so as to embrace any and all equivalent apparatus.

What is claimed is:

1. A remote control hazardous material handling device comprising:
    a movable base;
    an upstanding support pivotally secured to said base;
    a vertically adjustable support arm mounted on said upstanding support and extending generally horizontally therefrom;
    a horizontally adjustable gripper mounted on said support arm and comprising an adjustable closed-loop cable extending from diverging ends of a Y-shaped conduit;
    a first electric motor and drive means operatively associated with said support arm for vertically motivating said arm;
    a second electric motor and drive means operatively associated with said gripper for horizontally motivating said gripper;
    a third electric motor and drive means operatively associated with said upstanding support for pivotally motivating said support;
    a first remote control means electrically connected to said electric motors for controlling said motors from a remote location; and
    a second remote control means operatively associated with said gripper for controlling engagement and disengagement of the hazardous material by said gripper.

2. A remote control hazardous material handling device comprising:
    a movable base having rollers secured thereto;
    an upstanding support pivotally secured to said base;
    a vertically adjustable support arm mounted on said upstanding support and extending generally horizontally therefrom;
    a horizontally adjustable gripper mounted on said support arm and comprising an adjustable closed-loop cable extending from diverging ends of a Y-shaped conduit;
    a first reversible electric motor and mechanically cooperating worm drive operatively associated with said support arm for vertically motivating said arm;
    a second reversible electric motor and mechanically cooperating worm drive operatively associated with said gripper for horizontally motivating said gripper;
    a third reversible electric motor and mechanically cooperating sprocket and chain drive operatively associated with said upstanding support for pivotally motivating said upstanding support;
    a first remote control comprising switches electrically connected with each of said electric motors for independently controlling the rotational direction and speed thereof;
    a second remote control operatively associated with said gripper for controlling engagement and disengagement of the hazardous material by said gripper; and
    a closed circuit television system comprising a camera associated with said material handling device so as to generally focus on said gripper and hazardous material and an electrically connected television monitor for facilitating use of said first and second remote controls.

3. A remote control hazardous material handling device comprising:
    a movable base;
    an upstanding support pivotally secured to said base;
    a vertically adjustable support arm mounted on said upstanding support and extending generally horizontally therefrom;
    a horizontally adjustable gripper mounted on said support arm and comprising an adjustable closed-loop cable extending from diverging ends of a Y-shaped conduit;
    a first electric motor and drive means operatively associated with said support arm for vertically motivating said arm;
    a second electric motor and drive means operatively associated with said gripper for horizontally motivating said gripper;
    a third electric motor and drive means operatively associated with said upstanding support for pivotally motivating said support;
    a first remote control means electrically connected to said electric motors for controlling said motors from a remote location; and
    a second remote control means operatively associated with said gripper for controlling engagement and disengagement of the hazardous material by said gripper and comprising a coaxial cable with the inner cable forming said closed-loop cable at one end thereof and the other end thereof including an adjustment means for opening and closing said closed-loop cable.

4. A remote control hazardous material handling device comprising:
    a movable base having rollers secured thereto;
    an upstanding support pivotally secured to said base;
    a vertically adjustable support arm mounted on said upstanding support and extending generally horizontally therefrom;

a horizontally adjustable gripper mounted on said support arm and comprising an adjustable closed-loop cable extending from diverging ends of a Y-shaped conduit, said Y shaped conduit having resilient padding secured thereto;

a first reversible electric motor and mechanically cooperating worm drive operatively associated with said support arm for vertically motivating said support arm;

a second reversible electric motor and mechanically cooperating worm drive operatively associated with said gripper for horizontally motivating said gripper;

a third reversible electric motor and mechanically cooperating sprocket and chain drive operatively associated with said upstanding support for pivotally motivating said upstanding support;

a first remote control comprising switches electrically connected with each of said electric motors for independently controlling the rotational direction and speed thereof;

a second remote control operatively associated with said gripper for controlling engagement and disengagement of the hazardous material by said gripper and comprising a coaxial cable with the inner cable forming said closed-loop cable at one end thereof and the other end thereof including an adjustment means for opening and closing said closed-loop cable.

* * * * *